United States Patent
Park

(10) Patent No.: US 10,328,762 B2
(45) Date of Patent: Jun. 25, 2019

(54) ELECTRIC DAMPER FOR VEHICLE

(71) Applicant: HYUNDAI MOBIS CO., LTD., Seoul (KR)

(72) Inventor: Kyung Ryul Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 99 days.

(21) Appl. No.: 15/786,307

(22) Filed: Oct. 17, 2017

(65) Prior Publication Data

US 2018/0105007 A1 Apr. 19, 2018

(30) Foreign Application Priority Data

Oct. 18, 2016 (KR) .................. 10-2016-0134912

(51) Int. Cl.
*B60G 17/06* (2006.01)
*F16F 15/02* (2006.01)
*F16F 15/03* (2006.01)
*B60G 17/015* (2006.01)

(52) U.S. Cl.
CPC ......... *B60G 17/0157* (2013.01); *B60G 17/06* (2013.01); *F16F 15/022* (2013.01); *F16F 15/03* (2013.01); *B60G 2202/25* (2013.01); *B60G 2202/42* (2013.01); *B60G 2204/419* (2013.01); *B60G 2500/104* (2013.01); *F16F 2232/04* (2013.01); *F16F 2232/06* (2013.01)

(58) Field of Classification Search
CPC ............... B60G 17/0157; B60G 17/06; B60G 2204/419; B60G 2202/42; B60G 2202/25; B60G 2500/104; F16F 15/03; F16F 15/022; F16F 2232/06; F16F 2232/04
See application file for complete search history.

(56) References Cited

U.S. PATENT DOCUMENTS

| | | | | |
|---|---|---|---|---|
| 5,186,486 A | * | 2/1993 | Hynds ................ | B60G 17/0157 267/277 |
| 2005/0121269 A1 | * | 6/2005 | Namuduri ................ | F16F 9/53 188/267.1 |
| 2008/0223160 A1 | * | 9/2008 | Yamaguchi ............ | B60G 7/006 74/89.23 |
| 2013/0025986 A1 | * | 1/2013 | Lee ...................... | H02K 41/031 188/267 |
| 2013/0060422 A1 | * | 3/2013 | Ogawa .................. | B60G 13/02 701/37 |

(Continued)

*Primary Examiner* — Drew J Brown
(74) *Attorney, Agent, or Firm* — Knobbe Martens Olson & Bear LLP

(57) ABSTRACT

An electric damper for a vehicle may include: a housing body fixed to a vehicle body; a gear bar including a first end coupled to a knuckle of a wheel, and a second end extending into the housing body, with a rack gear provided on the gear bar; a first intersection gear unit installed in a direction intersecting a movement direction of the gear and configured to engage with the rack gear and rotate; a first power transmitting gear unit configured to engage with the first intersection gear unit and rotate, and including a rotating shaft installed parallel to the gear bar; a rotator configured to engage with the first power transmitting gear unit, and provided in a shape enclosing an outer surface of the gear bar; and a stator installed in the housing body at a position facing the rotator and having a magnetic force.

11 Claims, 5 Drawing Sheets

(56) References Cited

U.S. PATENT DOCUMENTS

| | | | |
|---|---|---|---|
| 2013/0144489 A1* | 6/2013 | Galasso | B60G 17/018 |
| | | | 701/37 |
| 2016/0121922 A1* | 5/2016 | Fujita | B62D 5/0448 |
| | | | 74/89.39 |
| 2016/0159185 A1* | 6/2016 | Kato | F16F 15/005 |
| | | | 701/37 |
| 2016/0197523 A1* | 7/2016 | Hosek | H02K 1/02 |
| | | | 310/43 |
| 2018/0250998 A1* | 9/2018 | Sigmar | B60G 17/06 |
| 2018/0266514 A1* | 9/2018 | Mori | F16F 9/34 |

\* cited by examiner

ELECTRIC DAMPER FOR VEHICLE

CROSS-REFERENCES TO RELATED APPLICATIONS

The present application claims priority to Korean application number 10-2016-0134912, filed on Oct. 18, 2016, which is incorporated by reference in its entirety.

BACKGROUND OF THE INVENTION

The present invention relates to an electric damper for a vehicle, and more particularly, to an electric damper for a vehicle which is capable of generating electricity using energy transmitted to the damper and controlling a damping operation of a wheel depending on operating conditions of the vehicle.

Generally, in a vehicle that is moving, vibrations are generated by unevenness of road surfaces or the operation of an engine. To restrain such vibrations, dampers are installed in the vehicle.

The dampers are installed on axles to dampen vibrations transmitted from road surfaces when the vehicle moves. A configuration of a damper provided with a motor to control the operation of the damper was proposed, but there is a problem in that it cannot generate electricity using energy transmitted from the outside of a vehicle to the damper. Therefore, there is a need to improve this configuration.

The background art of the present invention was introduced in Korean Patent Unexamined Publication No. 2013-0024002 (published on Mar. 8, 2013, entitled "Electric damper for vehicle").

SUMMARY OF THE INVENTION

Embodiments of the present invention are directed to an electric damper for a vehicle which is capable of generating electricity using energy transmitted to the damper and controlling a damping operation of a wheel depending on operating conditions of the vehicle.

In one embodiment, an electric damper for a vehicle, including: a housing body fixed to a vehicle body; a gear bar including a first end coupled to a knuckle of a wheel, and a second end extending into the housing body, with a rack gear provided on a side surface of the gear bar; a first intersection gear unit installed in a direction intersecting a movement direction of the gear and configured to engage with the rack gear and rotate; a first power transmitting gear unit configured to engage with the first intersection gear unit and rotate, and including a rotating shaft installed parallel to the gear bar; a rotor configured to engage with the first power transmitting gear unit and rotate, and provided in a shape enclosing an outer surface of the gear bar; and a stator installed in the housing body at a position facing the rotor and having a magnetic force.

The first intersection gear unit may include: a first pinion gear rotatably installed at a position facing the gear bar, and configured to engage with the rack gear and rotate; and a first connection gear extending from the first pinion gear and having a conical gear shape.

A rotating shaft of the first pinion gear may be installed in a direction perpendicularly intersecting the moving direction of the gear bar.

The first power transmitting gear unit may include: a first bevel gear including a rotating shaft intersecting a rotating shaft of the first connection gear and having a conical gear shape; and a first transmitting gear extending from the first bevel gear and including gear teeth engaging with an outer surface of the rotator, and configured to rotate along with the rotator.

The rotating shaft of the first bevel gear may be installed parallel to the gear bar and perpendicular to the rotating shaft of the first connection gear.

The electric damper may further include: a second intersection gear unit installed at a position facing the first intersection gear unit with the gear bar disposed therebetween, and configured to engage with the rack gear and rotate; and a second power transmitting gear unit including a rotating shaft installed parallel to the gear bar, and suitable for engaging with the second intersection gear unit and rotating, the second power transmitting gear unit being configured to engage with the outer surface of the rotator and rotate along with the first power transmitting gear unit.

The second intersection gear unit may include: a second pinion gear rotatably installed at a position facing the gear bar, and configured to engage with the rack gear and rotate; and a second connection gear extending from the second pinion gear and having a conical gear shape.

The second power transmitting gear unit may include: a second bevel gear including a rotating shaft intersecting a rotating shaft of the second connection gear, the second bevel gear having a conical gear shape; and a second transmitting gear extending from the second bevel gear and configured to engage with the outer surface of the rotator and rotate.

The rotating shaft of the second bevel gear may be installed parallel to the gear bar and perpendicular to the rotating shaft of the second connection gear.

The rotator and the stator may be installed on each of wheels of a four-wheel-drive vehicle and configured to control an installation length and a moving speed of the gear bar.

A bellows pipe may be installed around a portion of the gear bar that protrudes out of the housing body, and a knuckle bracket may be coupled to a portion of the gear bar that protrudes out of the bellows pipe.

In an electric damper for a vehicle according to the present invention, a gear bar is linearly moved by shocks transmitted from the outside of the vehicle, and a rotator is rotated by rotation of gears engaging with the gear bar, thus generating electricity. Consequently, the power consumption of the vehicle can be reduced.

Furthermore, the elements of the present invention including a stator, the rotator, and the gear bar are installed for each wheel of the vehicle. Therefore, the present invention can provide more stable driving conditions by controlling damping operations of the wheels depending on operating conditions of the vehicle.

DESCRIPTION OF SPECIFIC EMBODIMENTS

Hereinafter, an electric damper for a vehicle in accordance with an embodiment of the present invention will be described in detail with reference to the accompanying drawings. The size of each element, the thickness of lines indicating the element, etc. may be exaggerated for the purpose of clarity and convenience of description.

The terms and words used for elements in the description of the present invention are determined based on the functions of the elements in the present invention. The terms and words may be changed depending on the intention or custom of users or operators, so that they must be defined based on the whole content of the present specification.

Figure 1:
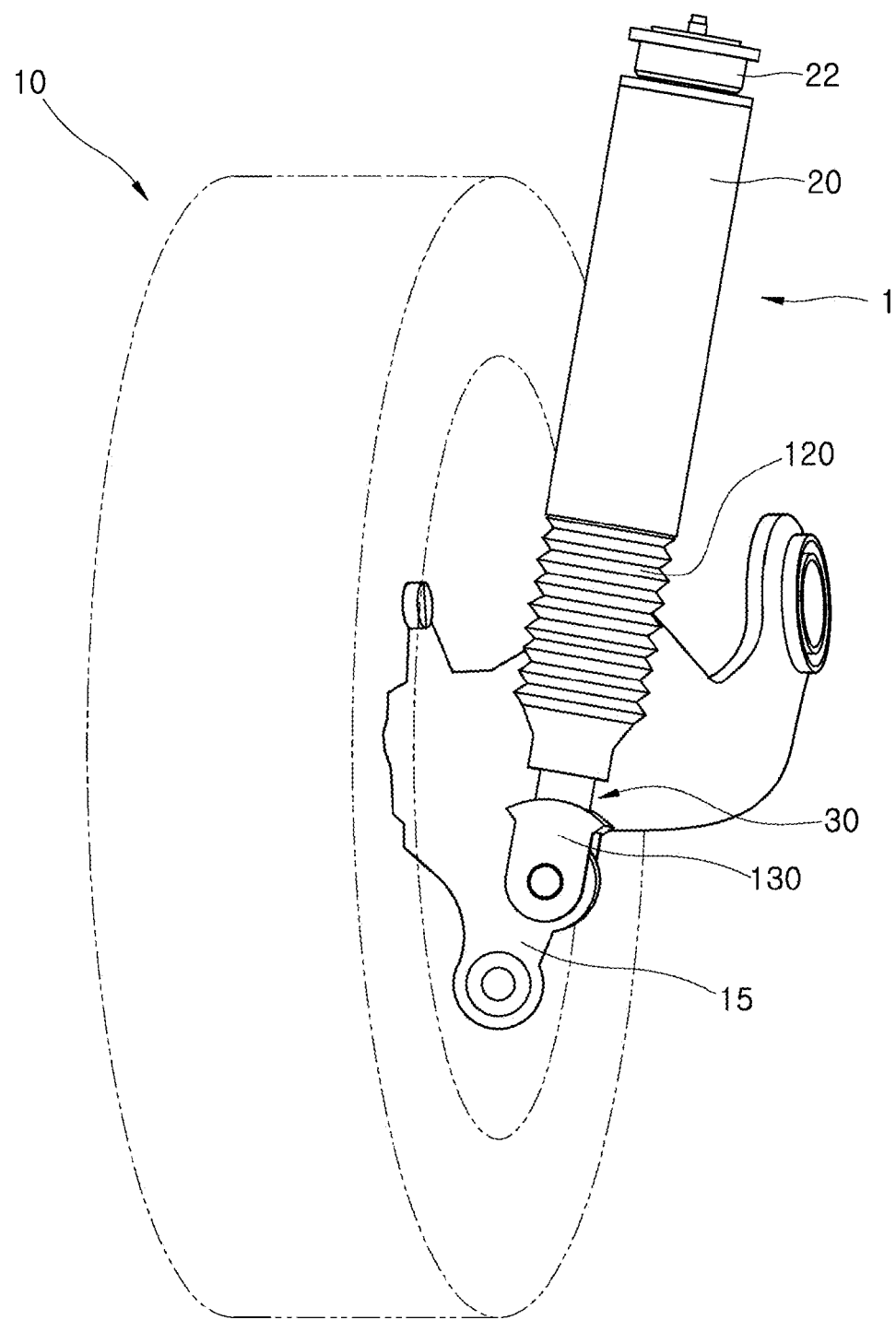
FIG. 1 is a perspective view schematically illustrating the installation of en electric damper for a vehicle in accordance with an embodiment of the present invention.
Figure 2:
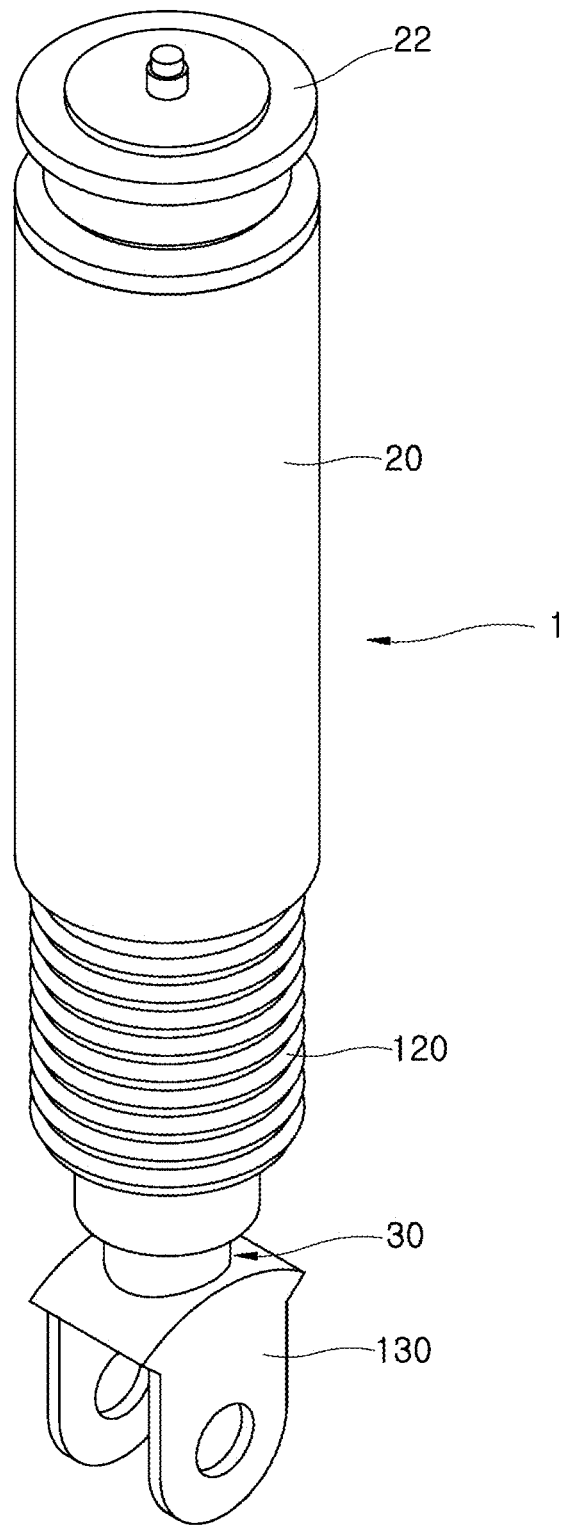
FIG. 2 is a perspective diagram illustrating the electric damper in accordance with an embodiment of the present invention.
Figure 3:
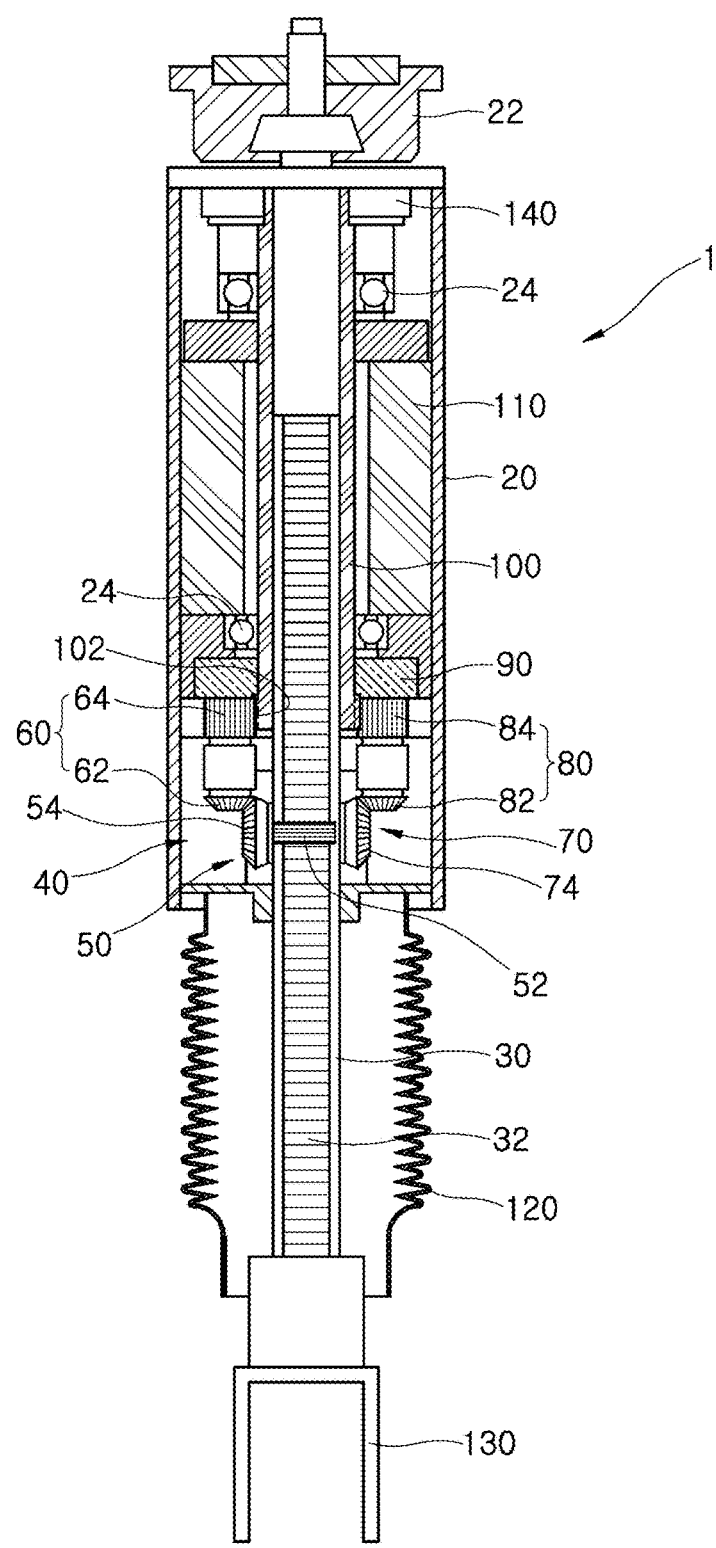
FIG. 3 is a diagram schematically illustrating the internal configuration of the electric damper in accordance with an embodiment of the present invention.
Figure 4:
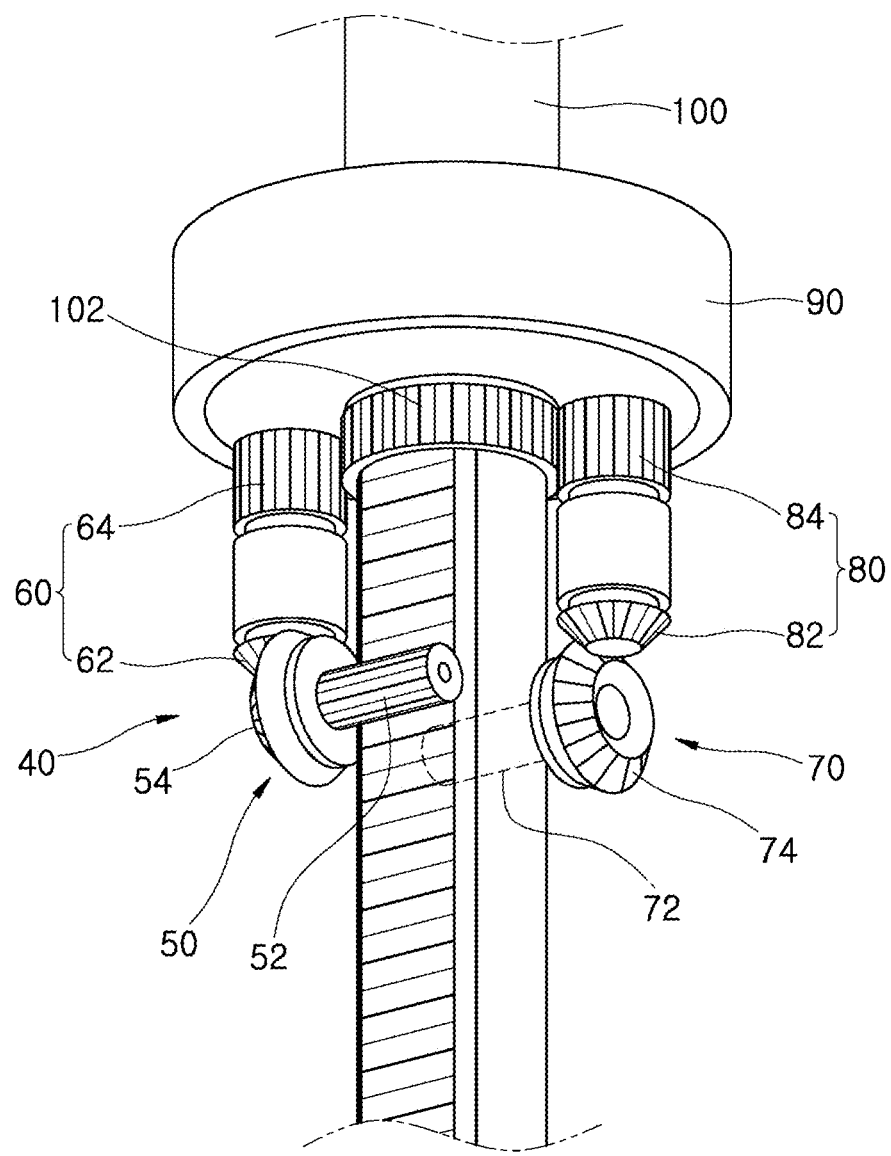
FIG. 4 is a perspective view schematically illustrating a main configuration of a gearbox unit in accordance with an embodiment of the present invention.
Figure 5:
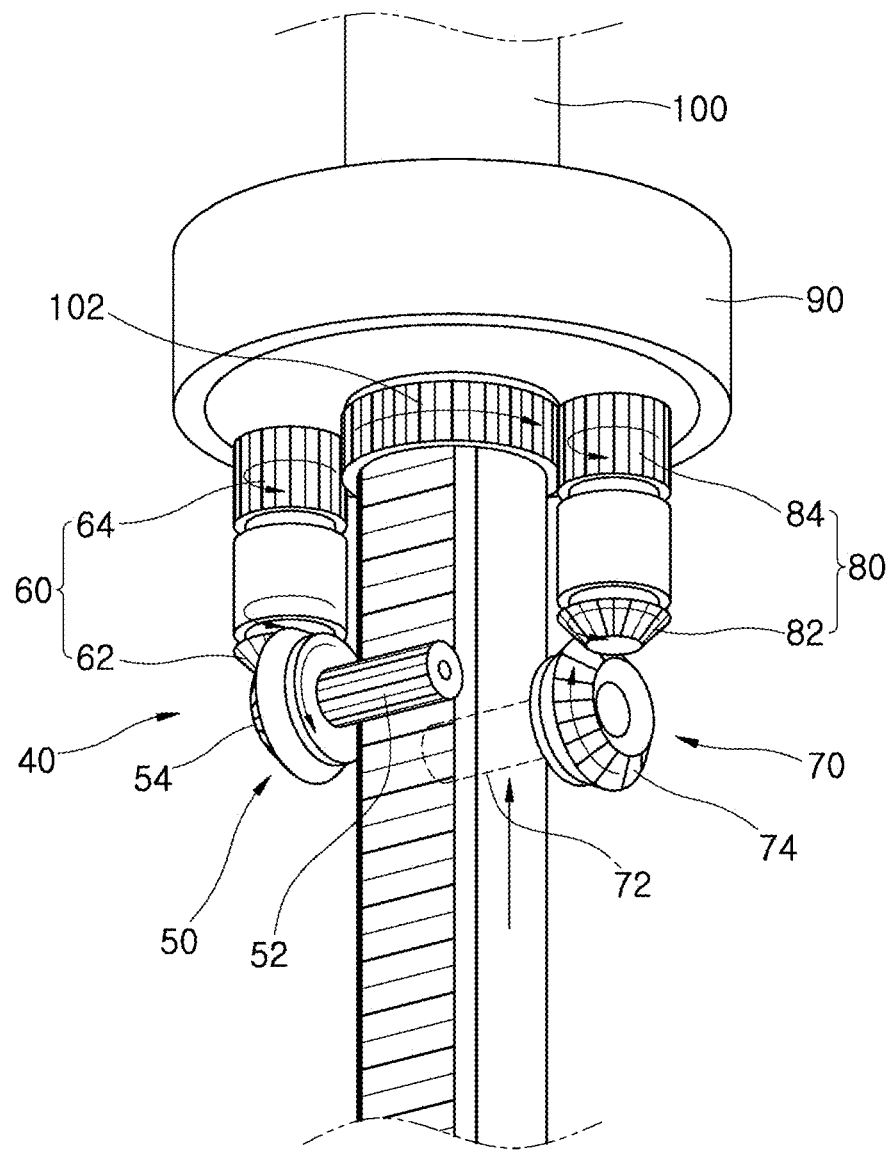
FIG. 5 is a perspective view schematically illustrating the operation of the gearbox unit in accordance with an embodiment of the present invention.

FIG. 1 is a perspective view schematically illustrating the installation of en electric damper for a vehicle in accordance with an embodiment of the present invention. FIG. 2 is a perspective diagram illustrating the electric damper in accordance with an embodiment of the present invention. FIG. 3 is a diagram schematically illustrating the internal configuration of the electric damper in accordance with an embodiment of the present invention. FIG. 4 is a perspective view schematically illustrating a main configuration of a gearbox unit in accordance with an embodiment of the present invention. FIG. 5 is a perspective view schematically illustrating the operation of the gearbox unit in accordance with an embodiment of the present invention.

As shown in FIGS. 1 to 4, the electric damper 1 in accordance with an embodiment of the present invention includes a housing boy 20, a gear bar 30, a first intersection gear unit 50, a first power transmitting gear unit 60, a rotator 100, a stator 110, a second intersection gear unit 70, and a second power transmitting gear unit 80. The housing body 20 is fixed to a vehicle body. The gear bar 30 includes a first end coupled to a knuckle 15 of a wheel 10, and a second end extending into the housing body 20, with a rack gear 32 provided on a side surface of the gear bar 30. The first intersection gear unit 50 is installed in a direction intersecting a movement direction of the gear bar 30, and configured to engage with the rack gear 32 and rotate. The first power transmitting gear unit 60 is configured to engage with the first intersection gear unit 50 and rotate, and includes a rotating axis provided parallel to the gear bar 30. The rotator 100 is configured to engage with the first power transmitting gear unit 60 and rotate, and provided in a shape enclosing an outer surface of the gear bar 30. The stator 110 is installed in the housing body 20 at a position facing the rotator 100 and has magnetic force. The second intersection gear unit 70 is installed at a position facing the first intersection gear unit 50 with the gear bar 30 disposed therebetween, and configured to engage with the rack gear 32 and rotate. The second power transmitting gear unit 80 has a rotating axis provided parallel to the gear bar 30, and is configured to engage with the second intersection gear unit 70 and rotate. The second power transmitting gear unit 80 is configured to engage, along with the first power transmitting gear unit 60, with an outer surface of the rotator 100 and rotate.

The electric damper 1 may be applied to all kinds of suspensions such as a double wishbone suspension, a MacPherson strut suspension, and a coupled torsion beam axle (CTBA) suspension, which need a shock absorption function. The electric damper 1 may be modified in various ways within a technical idea including an energy recovery operation in which elements of a gearbox unit 40 are operated by vertical movement of a suspension to rotate the rotator 100, and electricity is generated by the rotation of the rotator 100.

The knuckle 15 is installed on each wheel 10 of the vehicle. The electric damper 1 coupling the knuckle 15 to the vehicle body may reduce vibrations of the vehicle and generate electric energy. Furthermore, because the rotator 100 is rotated under the control of a controller of the vehicle, the damping force and the damping speed of the electric damper 1 may be controlled.

The housing body 20 may be changed in various shapes within a technical idea in which it is fixed to the vehicle body and has an operating space therein. The housing body 20 in accordance with an embodiment has a cylindrical tubular shape. A housing cover 22 is installed on a first end (an upper end in FIG. 3) of the housing body 20. The housing cover 22 is coupled to a mount bracket of the vehicle body, whereby the upper end of the housing 20 is fixed to the vehicle body. The separate housing cover 22 may be installed between the housing body 20 and the vehicle body. The vehicle-body-side mount bracket is coupled to the housing cover 22, and the housing cover 22 and the housing body 20 are fixed to each other by welding.

The first end of the gear bar 30 is coupled to the knuckle 15 of the wheel 10, and the second end thereof extends into the housing body 20. The rack gear 32 is formed on the side surface of the gear bar 30. In detail, the rack gear 32 is formed in a vertical longitudinal direction on the side surface of the gear bar 30 having a rod shape with a rectangular cross-section. The lower end of the gear bar 30 may be directly coupled to the knuckle 15, or coupled to the knuckle 15 by a knuckle bracket 130.

The gearbox unit 40 is installed in the housing body 20 and may employ various gear devices within a technical idea in which the rotator 100 is rotated by converting linear movement of the gear bar 30 into rotational movement. The gearbox unit 40 uses a rack-and-pinion gear and a bevel gear to convert the linear movement into the rotational movement. The gearbox unit 40 in accordance with an embodiment includes the first intersection gear unit 50, the second intersection gear unit 70, the first power transmitting gear unit 60, and the second power transmitting gear unit 80.

The first intersection gear unit 50 is installed in a direction intersecting the movement direction of the gear bar 30, and a gear engagement structure thereof may be modified in various ways within a technical idea in which it can engage with the rack gear 32 and rotate. The first intersection gear unit 50 in accordance with an embodiment includes a first pinion gear 52 which is rotatably installed at a position facing the gear bar and engages with the rack gear 32, and a first connection gear 54 which extends from the first pinion gear 52 and has a conical gear structure.

In the case where the housing body 20 is installed in the vertical direction and the gear bar 30 disposed in the housing body 20 is also installed in the vertical direction, a rotating shaft of the first pinion gear 52 is installed in a left-right horizontal direction. That is, the rotating shaft of the first pinion gear 52 is installed in a direction perpendicularly intersecting the movement direction of the gear bar 30. The rotating shaft that rotatably supports the first pinion gear 52 is installed in the housing body 20.

The first pinion gear 52 has a cylindrical shape and includes, on a circumferential surface thereof, gear teeth engaging with the rack gear 32.

The first connection gear 54 is installed on the same rotating shaft as that of the first pinion gear 52 and is coupled to the first pinion gear 52 so as to rotate along with the first pinion gear 52. The first connection gear 54 has a conical shape and includes gear teeth formed along an outer circumferential surface of the conical part thereof.

The first power transmitting gear unit 60 may employ various gears within a technical idea in which it engages with the first intersecting gear unit 50 so as to rotate and has a rotating shaft parallel to the gear bar 30. The first power transmitting gear unit 60 in accordance with an embodiment includes a first bevel gear 62 and a first transmitting gear 64.

The first bevel gear 62 includes a rotating shaft intersecting the rotating shaft of the first connection gear 54 and has a conical gear structure. The first connection gear 54 and the first bevel gear 62 are intersecting gears which have conical shapes and are perpendicularly connected to each other to transmit movement between two shafts.

The rotating shaft of the first bevel gear 62 is installed parallel to the gear bar 30 and perpendicular to the rotating shaft of the first connection gear 54.

The first transmitting gear 64 extends from the first bevel gear 62, includes gear teeth engaging with the outer surface of the rotator 100, and rotates along with the rotator 100. The first transmitting gear 64 has a cylindrical shape and is configured to engage with the outer surface of the rotator 100 and rotate.

The second intersection gear unit 70 may have various gear engagement structures within a technical idea in which it is installed at a position facing the first intersection gear unit 50 with the gear bar 30 disposed therebetween, is configured to engage with the rack gear 32 and rotate, and is provided in a direction intersecting the movement direction of the gear bar 30. The second intersection gear unit 70 in accordance with an embodiment includes a second pinion gear 72 and a second connection gear 74.

The second pinion gear 72 is rotatably installed facing the gear bar at a position opposite to the first intersection gear unit 50, and is configured to engage with the rack gear 32 and rotate.

In the case where the housing body 20 is installed in the vertical direction and the gear bar 30 disposed in the housing body 20 is also installed in the vertical direction, a rotating shaft of the second pinion gear 72 is installed in the left-right horizontal direction. That is, the rotating shaft of the second pinion gear 72 is installed in a direction perpendicularly intersecting the movement direction of the gear bar 30. The rotating shaft that rotatably supports the second pinion gear 72 is installed in the housing body 20.

The second pinion gear 72 has a cylindrical shape and includes, on a circumferential surface thereof, gear teeth engaging with the rack gear 32.

The second connection gear 74 extends from the second pinion gear 72 and has a conical gear structure. The second connection gear 74 is installed on the same rotating shaft as that of the second pinion gear 72 and is coupled to the second pinion gear 72 so as to rotate along with the second pinion gear 72. The second connection gear 74 has a conical shape and includes gear teeth formed along an outer circumferential surface of the conical part thereof.

The second power transmitting gear unit 80 has a rotating shaft provided parallel to the gear bar 30 and is configured to engage with the second intersection gear unit 70 and rotate. The second power transmitting gear unit 80, along with the first power transmitting gear unit 60, engages with the outer surface of the rotator 100 so as to rotate.

As shown in FIGS. 3 to 5, the second power transmitting gear unit 80 in accordance with an embodiment includes a second bevel gear 82 and a second transmitting gear 84.

The second bevel gear 82 includes a rotating shaft intersecting the rotating shaft of the second connection gear 74 and has a conical gear structure. The second connection gear 74 and the second bevel gear 82 are intersecting gears which have conical shapes and are perpendicularly connected to each other to transmit movement between two shafts.

The rotating shaft of the second bevel gear 82 is installed parallel to the gear bar 30 and perpendicular to the rotating shaft of the second connection gear 74.

The second transmitting gear 84 extends from the second bevel gear 82, includes gear teeth engaging with the outer surface of the rotator 100, and rotates along with the rotator 100. The second transmitting gear 84 has a cylindrical shape and is configured to engage with the outer surface of the rotator 100 and rotate.

In a state in which the first transmitting gear 64 and the second transmitting gear 84 engage with the outer surface of the rotator 100 and are installed so as to be rotatable, rotation of the first transmitting gear 64 and the second transmitting gear 84 is guided by a support unit 90. The support unit 90 is installed in the housing body 20. The rotator 100 and the gear bar 30 are installed passing through the support unit 90. The first transmitting gear 64 and the second transmitting gear 84 rotate along an outer surface of the support unit 90 having an annular shape.

The rotator 100 is configured to engage with the first power transmitting gear unit 60 and the second power transmitting gear unit 80 and rotate, and is provided in a shape enclosing the outer surface of the gear bar 30. The rotator 100 generates magnetic force and has a tubular shape. The rotator 100 is rotatably installed in the housing body 20. A bearing 24 is installed between the rotator 100 and the housing body 20 to reduce friction generated by rotation of the rotator 100. The upper end of the rotator 100 is coupled to a rotating body 140 and rotatably installed in the housing body 20. The lower end of the rotator 100 is coupled to the first power transmitting gear unit 60 and the second power transmitting gear unit 80.

The rotator 100 has a cylindrical shape. A rotating gear 102 is formed in a circumferential direction on the side surface of the rotator 100 that faces the first power transmitting gear unit 60 and the second power transmitting gear unit 80. Therefore, the rotating gear 102 engages with the first power transmitting gear unit 60 and the second power transmitting gear unit 80 so as to rotate.

The stator 110 is fixed in an inner surface of the housing body 20 that faces the rotator 100. The stator 110 having magnetic force generates electricity along with the rotator 100 when the rotator 100 rotates. There is known a technique in which the rotator 100 is rotatably installed in the stator 110 and electricity is induced between the stator 110 and the rotator 100 by rotation of the rotator 100; therefore, detailed description thereof will be omitted.

A bellows pipe 120 is provided around a portion of the gear bar 30 that protrudes out of the housing body 20. The knuckle bracket 130 is coupled to a portion of the gear bar 30 that protrudes out of the bellows pipe 120, thus facilitating the coupling of the electric damper to the knuckle 15.

The electric damper 1 including the rotator 100 and the stator 110 may be installed on each wheel 10 of a four-wheel-drive vehicle, and a setting length and a moving speed of the gear bar 30 may be controlled. Hence, the electric damper 1 may make the vehicle that is moving more stable.

Hereinafter, the operation of the electric damper 1 in accordance with an embodiment of the present invention will be described in detail with reference to the accompanying drawings.

When the vehicle is moving, external shocks are transmitted to the gear bar 30 through the knuckle 15, thus moving the gear bar 30 in the vertical direction. The first intersection gear unit 50 and the second intersection gear unit 70 are rotated by the vertical movement of the gear bar 30. The first pinion gear 52 of the first intersection gear unit 50 engages with the rack gear 32 of the gear bar 30 and rotates. The second pinion gear 72 of the second intersection gear unit 70 engages with the rack gear 32 of the gear bar 30 and rotates.

Therefore, the first connection gear 54 along with the first pinion gear 52 rotates, and the first bevel gear 62 engaging with the first connection gear 54 rotates, so that the first transmitting gear 64 also rotates along with the first bevel gear 62. In addition, the second connection gear 74 along with the second pinion gear 72 rotates, and the second bevel gear 82 engaging with the second connection gear 74 rotates, so that the second transmitting gear 84 also rotates along with the second bevel gear 82.

The first transmitting gear 64 and the second transmitting gear 84 engage with the rotating gear 102 of the rotator 100. The rotator 100 is also rotated by rotation of the rotating gear 102, thus generating electricity. The generated electricity charges a battery of the vehicle.

The electric damper 1 installed between the vehicle body and the suspension may be used as an energy recovery apparatus, wherein the rotator 100 is rotated by converting linear movement resulting from the vertical movement of the vehicle into rotational movement, thus storing energy.

The direction of power transmission is converted from the vertical direction into the horizontal direction by the gear bar 30 using the rack-and-pinion gear, the first intersection gear unit 50, and the second intersection gear unit 70.

Thereafter, the direction of power transmission is changed to the direction parallel to the gear bar 30 both by the first intersection gear unit 50 and the first power transmitting gear unit 60 that use bevel gears and by the second intersection gear unit 70 and the second power transmitting gear unit 80.

Counter electromotive force is generated by the rotator 100 that is rotated by the first power transmitting gear unit 60 and the second power transmitting gear unit 80, whereby electric energy can be collected.

The electric damper 1 may adjust the height of the vehicle on the corresponding wheel 10 and also adjust the damping force for the corresponding wheel 10.

The damping force is formed by generating, using the operation of the rotator 100 and the stator 110, torque and propulsion force both against external force applied from the outside of the vehicle and against the movement speed of the gear bar 30. The rotator 100 and the stator 110 that constitute a motor can be controlled by the operation of the controller of the vehicle.

The controller of the vehicle may control the damping force by controlling the rotator 100 and the stator 110 and generating reverse torque for restricting the movement of the gear bar 30 with a preset force. When external force supplied to the electric damper 1 is greater than the reverse torque applied to the electric damper 1, the gear bar 30 moves in the vertical direction so that the rotator 100 rotates, thus generating electricity.

In other words, the stator 110 and the rotator 100 are controlled by the controller so that the damping force for restricting the movement of the gear bar 30 with a preset force can be generated. When the gear bar 30 is moved by external force greater than the damping force, electric energy is generated for energy regeneration.

The operation of the electric damper 1 for implementing a function as a shock absorber will be described in more detail.

When the gear bar 30 is linearly moved in the vertical direction by external force transmitted to the gear bar 30, the first intersection gear unit 50 and the second intersection gear unit 70 are rotated, thus rotating the first power transmitting gear unit 60 and the second power transmitting gear unit 80.

When the rotation power of the first power transmitting gear unit 60 and the second power transmitting gear unit 80 is transmitted to the rotator 100, the controller of the vehicle generates reverse torque by controlling the stator 110 and the rotator 100. Hence, the damping force transmitted to the rotator 100 is transmitted again to the first intersection gear unit 50 and the second intersection gear unit 70 through the first power transmitting gear unit 60 and the second power transmitting gear unit 80 and then transmitted to the gear bar 30, thus generating repulsive force against the external force.

This repulsive force may be a damping force pertaining to ride comfort of the vehicle. Simultaneously, because the rotator 100 rotates interlocking with the vertical movement of the gear bar 30, electricity can be generated, thus making energy recovery possible.

If the electric damper 1 in accordance with the present invention is mounted to each wheel 10 such that it is independently controlled, a damping stroke of each wheel 10 can be controlled in response to a pot hole, a speed bump, etc. depending on road surface conditions, whereby shocks transmitted to the vehicle or deterioration in ride comfort can be minimized.

Furthermore, when the vehicle moves on a highway ramp section or a steep curve section, lateral rolling of the vehicle can be coped with by controlling the damping stroke of each wheel 10. When a sudden braking event or a rapid acceleration event of the vehicle is caused, pitching motion of the vehicle can be coped with by controlling the damping strokes of the front wheels and the rear wheels.

In addition, thanks to a four-wheel independent control structure, the damping force and the position of each wheel can be adjusted, and the height of the vehicle can be arbitrarily increased or reduced on a particular road section.

For example, when the vehicle turns to the right, a right part of the vehicle body is lifted by centrifugal force while a left part of the vehicle body is pushed downward. Thus, the vehicle body tilts or leans to the left.

In the case where the vehicle body tilts to the left, the controller installed in the vehicle senses, using an inclination sensor, an inclination of the vehicle body and a direction in which the vehicle tilts, calculates a control signal in response to this, and controls the operation of the stator 110 and the rotator 100 that constitute the motor.

In detail, the rotator 100 installed on each wheel 10 of the right part of the vehicle rotates to move the corresponding gear bar 30 such that the overall length of the gear bar 30 disposed in the right part of the vehicle body is reduced. As the overall length of the gear bar 30 is reduced, a phenomenon in which the right part of the vehicle body is lifted from the ground is restricted.

The rotator 100 of the electric damper 1 installed in the left part of the vehicle rotates to move the corresponding gear bar 30 such that the overall length of the gear bar 30 disposed in the left part of the vehicle body is increased. As the overall length of the gear bar 30 is increased, a phenomenon in which the left part of the vehicle body is pushed downward is restricted.

When the vehicle passes over a bump or moves on a rough road, the controller that senses the movement of the vehicle adjusts the lengths of the gear bars 30 of the electric dampers 1 installed on the respective wheels 10 or independently the damping forces of the electric dampers 1, thus enhancing the driving performance or stability of the vehicle.

As described above, in the present invention, the gear bar 30 is linearly moved by shocks transmitted from the outside of the vehicle so that the rotator 100 is rotated by the rotation of the gears engaging with the gear bar 30 and thus generates electricity, thereby reducing energy consumption. Furthermore, because the elements of the present invention including the stator 110, the rotator 100, and the gear bar 30 are installed on each wheel of the vehicle, the damping operation of each wheel 10 can be controlled depending on the driving conditions of the vehicle, whereby stable operating conditions of the vehicle can be provided.

In addition, electric energy can be collected using the same compressing and expanding operation as that of a general vehicle damper, and the functions of an active suspension can be obtained. Furthermore, the present invention can be used not only as an energy regenerating damper but also as an active damper. In addition, the necessity of operating a generator for charging the battery is reduced, whereby fuel consumption is reduced to be environment friendly.

While the present invention has been described with respect to the specific embodiments illustrated in the attached drawings, these are only for illustrative purposes, and it will be apparent to those skilled in the art that various changes and modifications may be made without departing from the spirit and scope of the invention as defined in the following claims.

What is claimed is:

1. An electric damper for a vehicle, comprising:
   a housing body fixed to a vehicle body;
   a gear bar including a first end coupled to a knuckle of a wheel, and a second end extending into the housing body, with a rack gear provided on a side surface of the gear bar;
   a first intersection gear unit installed in a direction intersecting a movement direction of the gear bar and configured to engage with the rack gear and rotate;
   a first power transmitting gear unit configured to engage with the first intersection gear unit and rotate, and including a rotating shaft installed parallel to the gear bar;
   a rotator configured to engage with the first power transmitting gear unit and rotate, and provided in a shape enclosing an outer surface of the gear bar; and
   a stator installed in the housing body at a position facing the rotator and having a magnetic force.

2. The electric damper of claim 1, wherein the first intersection gear unit comprises:
   a first pinion gear rotatably installed at a position facing the gear bar, and configured to engage with the rack gear and rotate; and
   a first connection gear extending from the first pinion gear and having a conical gear shape.

3. The electric damper of claim 2, wherein a rotating shaft of the first pinion gear is installed in a direction perpendicularly intersecting the moving direction of the gear bar.

4. The electric damper of claim 2, wherein the first power transmitting gear unit comprises:
   a first bevel gear including a rotating shaft intersecting a rotating shaft of the first connection gear and having a conical gear shape; and
   a first transmitting gear extending from the first bevel gear and including gear teeth engaging with an outer surface of the rotator, and configured to rotate along with the rotator.

5. The electric damper of claim 4, wherein the rotating shaft of the first bevel gear is installed parallel to the gear bar and perpendicular to the rotating shaft of the first connection gear.

6. The electric damper of claim 1, further comprising:
   a second intersection gear unit installed at a position facing the first intersection gear unit with the gear bar disposed therebetween, and configured to engage with the rack gear and rotate; and
   a second power transmitting gear unit including a rotating shaft installed parallel to the gear bar, and suitable for engaging with the second intersection gear unit and rotating, the second power transmitting gear unit being configured to engage with the outer surface of the rotator and rotate along with the first power transmitting gear unit.

7. The electric damper of claim 6, wherein the second intersection gear unit comprises:
   a second pinion gear rotatably installed at a position facing the gear bar, and configured to engage with the rack gear and rotate; and
   a second connection gear extending from the second pinion gear and having a conical gear shape.

8. The electric damper of claim 7, wherein the second power transmitting gear unit comprises:
   a second bevel gear including a rotating shaft intersecting a rotating shaft of the second connection gear, the second bevel gear having a conical gear shape; and
   a second transmitting gear extending from the second bevel gear and configured to engage with the outer surface of the rotator and rotate.

9. The electric damper of claim 8, wherein the rotating shaft of the second bevel gear is installed parallel to the gear bar and perpendicular to the rotating shaft of the second connection gear.

10. The electric damper of claim 6, wherein the rotator and the stator are installed on each of wheels of a four-wheel-drive vehicle and configured to control an installation length and a moving speed of the gear bar.

11. The electric damper of claim 1, wherein a bellows pipe is installed around a portion of the gear bar that protrudes out of the housing body, and a knuckle bracket is coupled to a portion of the gear bar that protrudes out of the bellows pipe.

* * * * *